United States Patent
Jones

(10) Patent No.: US 7,345,455 B2
(45) Date of Patent: Mar. 18, 2008

(54) STAGGERED BACKUP BATTERY CHARGING SYSTEM

(75) Inventor: Carl E. Jones, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 10/991,914

(22) Filed: Nov. 18, 2004

(65) Prior Publication Data

US 2006/0103352 A1     May 18, 2006

(51) Int. Cl.
*H02J 7/00* (2006.01)
(52) U.S. Cl. ............... 320/148; 320/110; 320/112; 320/128; 320/132; 320/134; 320/149; 320/157; 320/158; 320/119; 320/121; 320/122; 320/118; 320/125
(58) Field of Classification Search ............ 320/110, 320/112, 128, 148, 9, 157, 158, 132, 134, 320/135, 149, 118, 119, 120, 121, 122, 125
See application file for complete search history.

(56) References Cited

U.S. PATENT DOCUMENTS

| | | | | |
|---|---|---|---|---|
| 5,115,182 A * | 5/1992 | Ehmke et al. | ............... | 320/136 |
| 5,280,231 A * | 1/1994 | Kato et al. | ..................... | 322/28 |
| 5,331,268 A * | 7/1994 | Patino et al. | ............... | 320/158 |
| 5,352,966 A * | 10/1994 | Irons | ........................... | 320/103 |
| 5,412,323 A * | 5/1995 | Kato et al. | .................. | 324/429 |
| 5,525,888 A * | 6/1996 | Toya | ........................... | 320/111 |
| 5,592,064 A * | 1/1997 | Morita | ........................ | 320/110 |
| 5,627,449 A * | 5/1997 | Fujiki | ........................ | 320/106 |
| 5,635,813 A * | 6/1997 | Shiga et al. | ................ | 320/106 |
| 5,652,499 A * | 7/1997 | Morita et al. | ............... | 320/112 |
| 5,703,463 A * | 12/1997 | Smith | ......................... | 320/134 |
| 5,739,596 A * | 4/1998 | Takizawa et al. | ............ | 307/66 |
| 5,780,993 A * | 7/1998 | Tsang | ......................... | 320/111 |
| 5,784,626 A * | 7/1998 | Odaohara | ................... | 713/300 |
| 5,831,350 A * | 11/1998 | McConkey et al. | ......... | 307/150 |
| 5,835,989 A * | 11/1998 | Nagai | ......................... | 307/116 |
| 5,861,729 A * | 1/1999 | Maeda et al. | ............... | 320/106 |
| 5,905,361 A * | 5/1999 | Saeki et al. | ................. | 320/119 |
| 6,124,797 A * | 9/2000 | Mercado | ................ | 340/636.15 |
| 6,329,792 B1 * | 12/2001 | Dunn et al. | ................. | 320/132 |
| 6,346,794 B1 | 2/2002 | Odaohhara | | |

(Continued)

FOREIGN PATENT DOCUMENTS

WO     WO 00/54359     9/2000

*Primary Examiner*—Bao Q. Vu
*Assistant Examiner*—M'baye Diao
(74) *Attorney, Agent, or Firm*—Quarles & Brady LLP

(57) ABSTRACT

A battery backup system includes a control device including a power sensing device, a discharge circuit, a charging circuit, and a plurality of battery packs. A lower threshold is established representative of a minimum acceptable effective energy capacity. Each battery pack is recharged if its effective energy capacity falls below the lower threshold. Additionally, an upper threshold is established representative of the minimum acceptable effective energy capacity plus a performance margin. In a two battery-pack system, if both battery packs fall below the upper threshold, the battery with the least effective energy capacity is discharged to the minimum acceptable effective energy capacity and then recharged to the battery pack's maximum energy capacity. In this way, both battery packs are prevented from approaching the minimum acceptable effective energy capacity at the same time. This reduces the size or number of battery packs and reduces their associated cost and volume.

4 Claims, 5 Drawing Sheets

U.S. PATENT DOCUMENTS

| | | |
|---|---|---|
| 6,353,304 B1 | 3/2002 | Atcitty et al. |
| 6,369,576 B1 | 4/2002 | Matthews et al. |
| 6,504,344 B1 | 1/2003 | Adams et al. |
| 6,545,445 B1 | 4/2003 | McDermott et al. |
| 6,583,603 B1 | 6/2003 | Baldwin |
| 6,803,745 B2 * | 10/2004 | Nishida et al. ............. 320/112 |
| 7,061,247 B2 * | 6/2006 | Inokuchi et al. ............ 324/430 |
| 2005/0280393 A1 * | 12/2005 | Feldmann ................... 320/114 |

* cited by examiner

STAGGERED BACKUP BATTERY CHARGING SYSTEM

BACKGROUND OF THE INVENTION

1. Field of the Invention

This invention is related in general to the field of backup-battery systems. In particular, the invention consists of a system for staggering the charging of a plurality of backup-battery packs so as to reduce the number or size of the battery packs.

2. Description of the Prior Art

In FIG. 1, a traditional backup-battery system 10 includes a control device 12 having a power sensor 14, a charging circuit 16, and one or more battery packs 18. Each battery pack 18 includes one or more batteries 20 and has a maximum energy capacity based on the physical characteristics of the batteries. Once discharged below a predetermined discharge threshold, some battery packs are designed to be recharged to their maximum energy capacity. However, a battery pack's maximum energy capacity will deteriorate over time due to temperature fluctuations, repetitive charging/discharging, and other chemical reactions. For example, a typical battery may lose up to 20% of its maximum energy capacity over its useful life. This decrease is maximum energy capacity is more pronounced in some types of batteries if they are not fully discharged to their discharge threshold prior to being recharged.

If a battery pack is charged to its current maximum energy capacity, the charge will also deteriorate over time ("self-discharge"), even when not under load, due to chemical reactions within the battery. One approach is to provide a continuous charge ("trickle charge") to the battery pack to prevent self-discharge. However, this creates other problems such as dramatically reduced battery life. Accordingly, it is desirable to have a backup-battery system to compensate for self-discharge without incurring the reduced battery-life penalty of trickle charging.

The energy available to power devices ("effective energy capacity") is a function of the current maximum energy capacity, the current amount of self-discharge, the current temperature, and the load placed on the battery pack. This effective energy capacity is often significantly less than a battery pack's original maximum energy capacity. Accordingly, a backup-battery system must be designed to provide a sufficient effective energy capacity to power a load, even if the effective energy capacity is significantly lower than a battery pack's original maximum energy capacity.

Another approach is to utilize a battery pack with an initial maximum energy capacity significantly higher than that needed to power the intended load. However, increasing a backup-battery system's initial maximum energy capacity is costly and requires a larger volume of space for the correspondingly larger battery pack. Additionally, increasing the size of a battery pack can dramatically increase the weight of the backup-battery system.

Yet another approach is to utilize multiple battery packs with a combined initial maximum energy capacity significantly greater than necessary for the design load. Since the packs are in the same environment, they will tend to self-discharge at the same rate, potentially reaching the discharge threshold at approximately the same time. This solution suffers the same drawbacks as utilizing a single larger battery pack, i.e., increased cost, volume, and weight. Therefore, it is desirable to have a system for charging multiple backup-battery packs that prevents the battery packs from approaching the discharge threshold at the same time.

In U.S. Pat. No. 6,583,603, Baldwin discloses an apparatus for charging and discharging battery cells employed as a back-up power supply. The apparatus partially isolates battery cells from a load bus and power supply utilizing two control switches arranged in parallel. One of the control switches connects one set of batteries to the load bus at a time. However, while Baldwin discloses charging sets of batteries independent of other sets, he does not disclose preventing a plurality of battery packs from simultaneously approaching a discharge threshold.

U.S. Pat. No. 6,504,344, Adams et al. disclose a device for managing battery packs. A controller directs the selective load-testing of individual batteries. A battery whose useful capacity has fallen below a predetermined threshold is recharged. However, as with the Baldwin patent, Adams does not disclose alternating the charging of parallel battery packs to reduce the amount of excess design capacity. Accordingly, it is desirable to have a backup-battery system capable of staggering the charging of multiple battery packs to minimize the required initial maximum energy capacity.

SUMMARY OF THE INVENTION

The invention disclosed herein utilizes a backup-battery system including a control device having a power sensing device, a charging circuit, a plurality of battery packs, and a discharge circuit. Each battery pack includes one or more batteries. A lower threshold, representative of a minimum acceptable effective energy capacity, is established by the control device. Each battery pack is recharged if its effective energy capacity falls below the lower threshold. Additionally, an upper threshold is established representative of the minimum acceptable effective energy capacity plus a performance margin.

In a two battery-pack system, if both battery packs fall below the upper threshold, the battery pack with the least effective energy capacity is recharged to the battery pack's maximum energy capacity. In this way, both battery packs are prevented from approaching the minimum acceptable effective energy capacity at the same time. This reduces the size or number of battery packs and reduces their associated cost and volume. In order to maximize battery life and reduce the deterioration of a battery pack's maximum energy capacity, the battery pack may be discharged to the minimum acceptable effective energy capacity before being recharged.

The invention can be extended to a backup battery system having three or more battery packs. If two or more battery packs fall below the upper threshold, the battery pack with the least effective energy capacity is discharged and then recharged to maximum energy capacity. Alternatively, the upper threshold may be set so that a battery pack is discharged and recharged only when all the battery packs fall below the upper threshold.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of using a control device to establish a lower and an upper threshold of effective energy capacity and to stagger the charging of a plurality of battery packs according to these thresholds. The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 1:
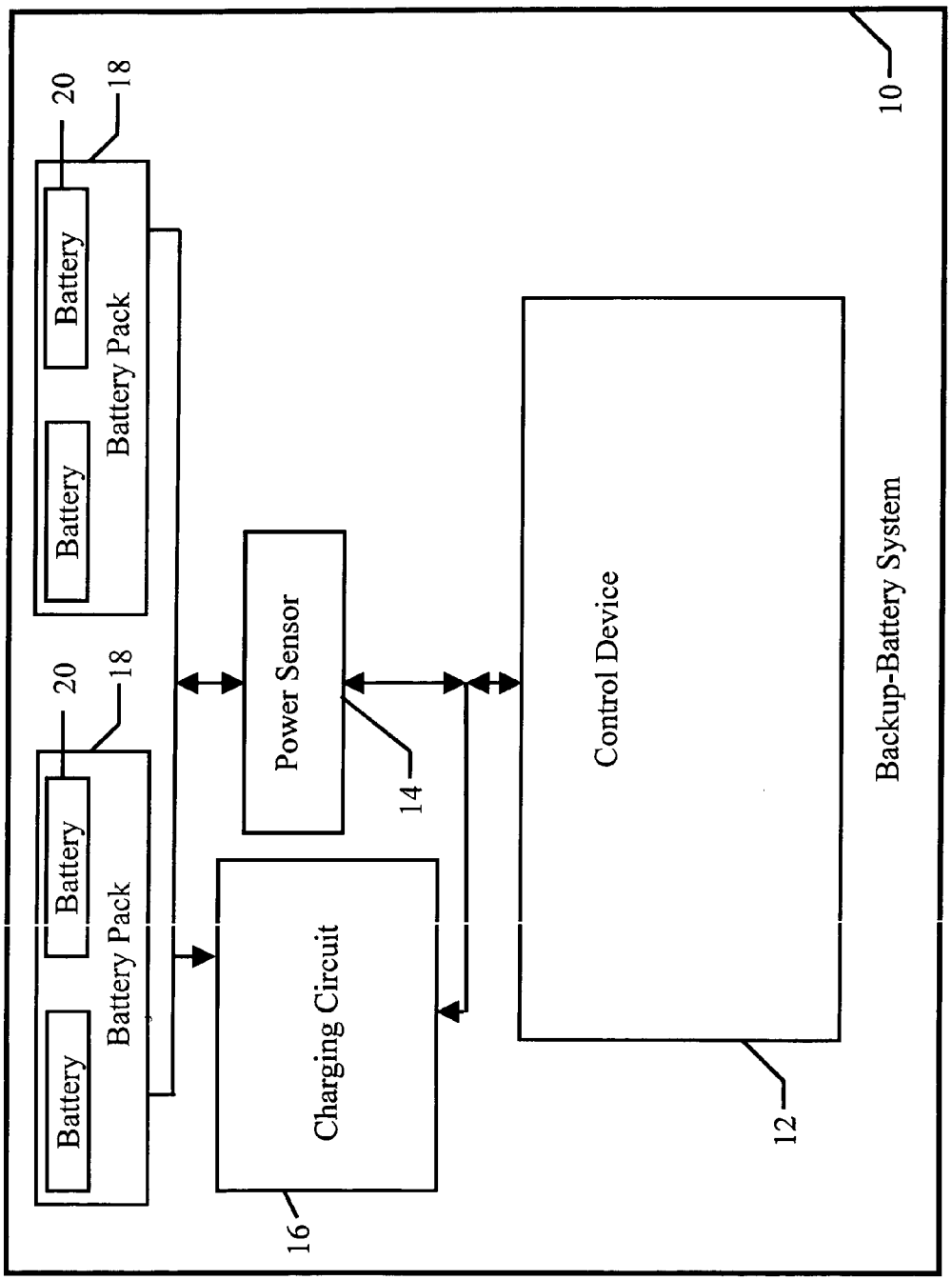
FIG. 1 is a block diagram illustrating a traditional backup battery system including a control device having a power sensor, a charging circuit, and a plurality of battery packs, each battery pack including one or more batteries.
Figure 2:
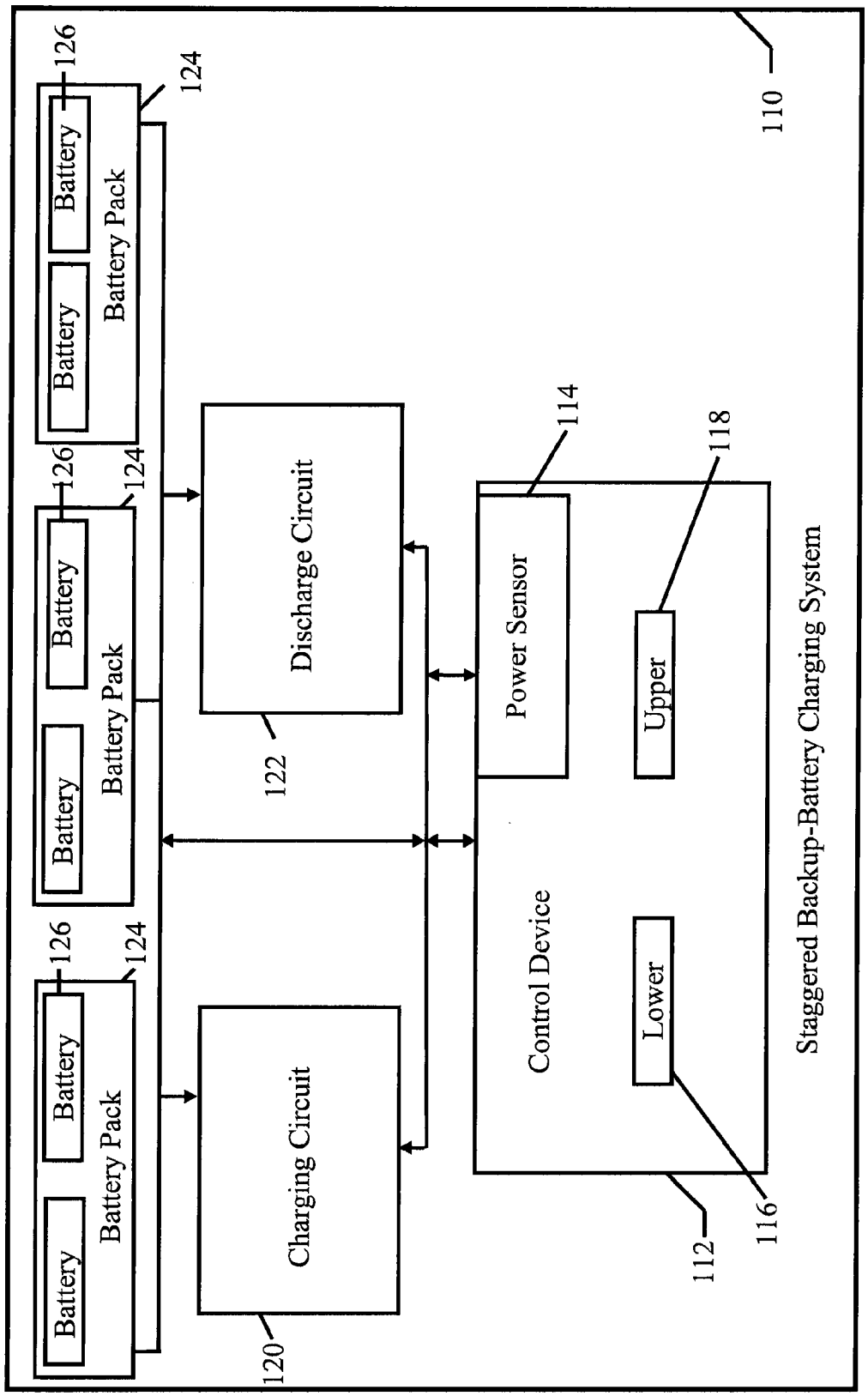
FIG. 2 is a block diagram of a staggered backup-battery charging system including a control device having a power sensor and a lower and an upper threshold, a charging circuit, a discharge circuit, and a plurality of battery packs, each battery pack including one or more batteries.

Referring to figures, wherein like parts are designated with the same reference numerals and symbols, FIG. 2 is a block diagram illustrating a staggered backup-battery charging system 110 including a control device 112 having a power sensor 114, a lower threshold 116, and an upper threshold 118. The staggered backup-battery charging system 110 also includes a charging circuit 120, a discharge circuit 122, and a plurality of battery packs 124. Each battery pack 124 includes one or more batteries 126. The power sensor 114 measures the energy stored in each battery pack 124 using a voltage sensor, a current sensor, or a combination of the two, and may include a test load. The charging circuit 120 may include a power source, a relay, and a current limiting device. The discharge circuit 122 may include its own relay and another current limiting device.

The lower threshold 116 establishes of a minimum acceptable effective energy capacity and each battery pack 124 is recharged if its effective energy capacity falls below the lower threshold. The upper threshold 118 is representative of the minimum acceptable effective energy capacity of the lower threshold 116 plus a performance margin. In one exemplary embodiment of the invention, the lower threshold 116 is set at 60% of a battery pack's initial maximum energy capacity and the upper threshold 118 is set at 80% of the battery pack's initial maximum energy capacity.

The upper threshold 118 may be chosen to represent an energy capacity achieved through self-discharge in one half the time a battery pack will self-discharge to the lower threshold 116. However, in practice, the upper threshold is a function of several variables such as temperature and individual variances in self-discharge rates of different battery packs. Additionally, temperature effects can be accounted for by monitoring the environment and adjusting the nominal self-discharge rate according to tables or equations. The effects of the variations between self-discharge rates of different battery packs can be adjusted by monitoring the actual self-discharge of each battery pack versus time and adjusting the tables or equations accordingly.

Figure 3:
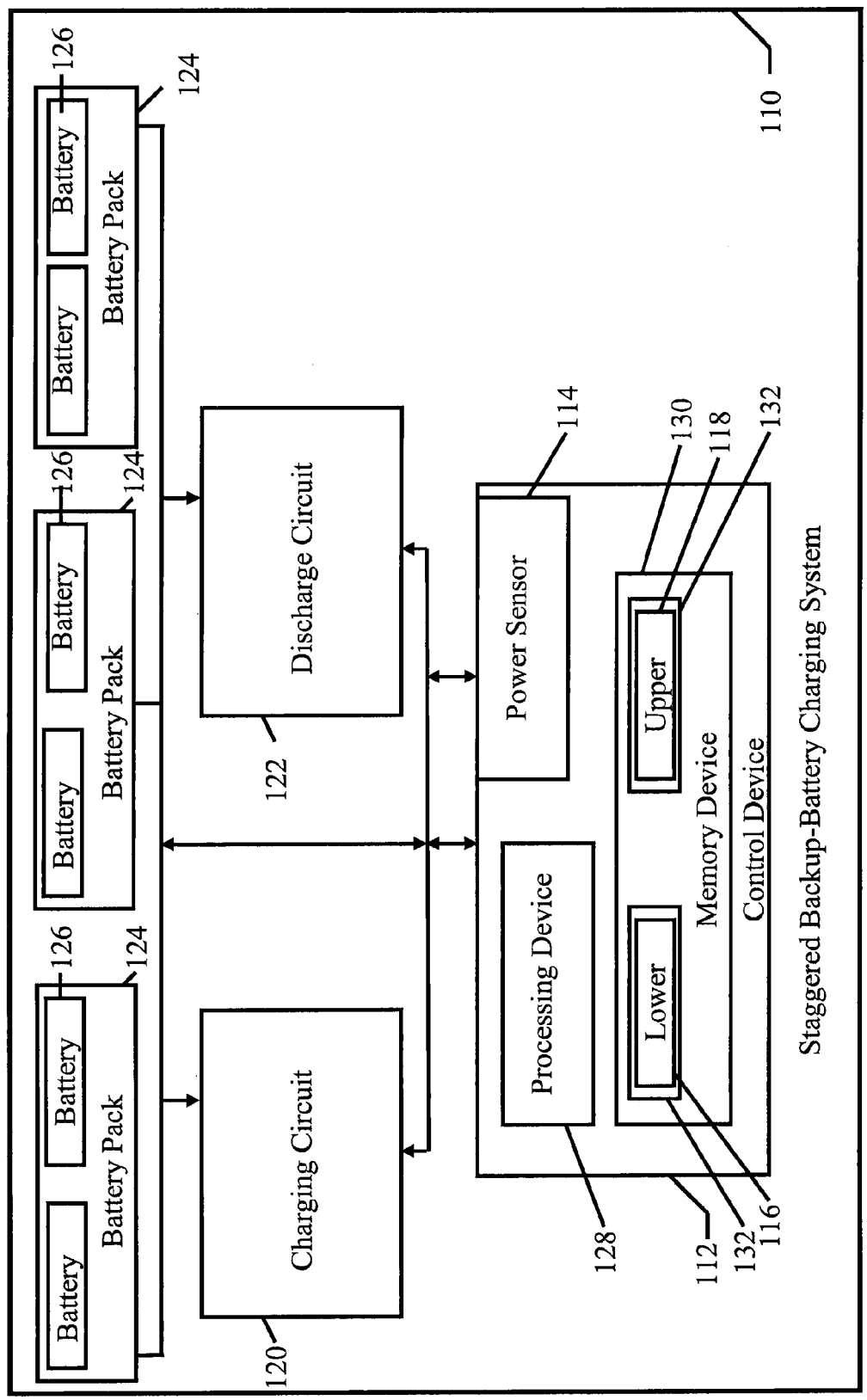
FIG. 3 is a block diagram of the control device of FIG. 2, wherein the control device includes a processing device and a memory device, the memory device including memory locations holding the lower and upper thresholds.

FIG. 3 is a block diagram of one embodiment of the control device 112 of FIG. 2, wherein the control device 112 includes a processing device 128 and a memory device 130. The memory device 130 includes memory locations 132 holding the lower and upper thresholds 116,118.

The processing device may be a micro-processor, a general purpose central processing unit ("CPU"), or programmable device such as an FPGA, ASIC, PLA, or CPLD. The memory device may a random-access-memory ("RAM") device, a Flash RAM, or set of registers within the processing device 128. In this embodiment of the invention, the control device 112 is responsible for controlling the power sensor 114, the charging circuit 120, and the discharge circuit. Additionally, the control device 112 compares information from the power sensor 114 to the lower and upper thresholds.

Figure 4:
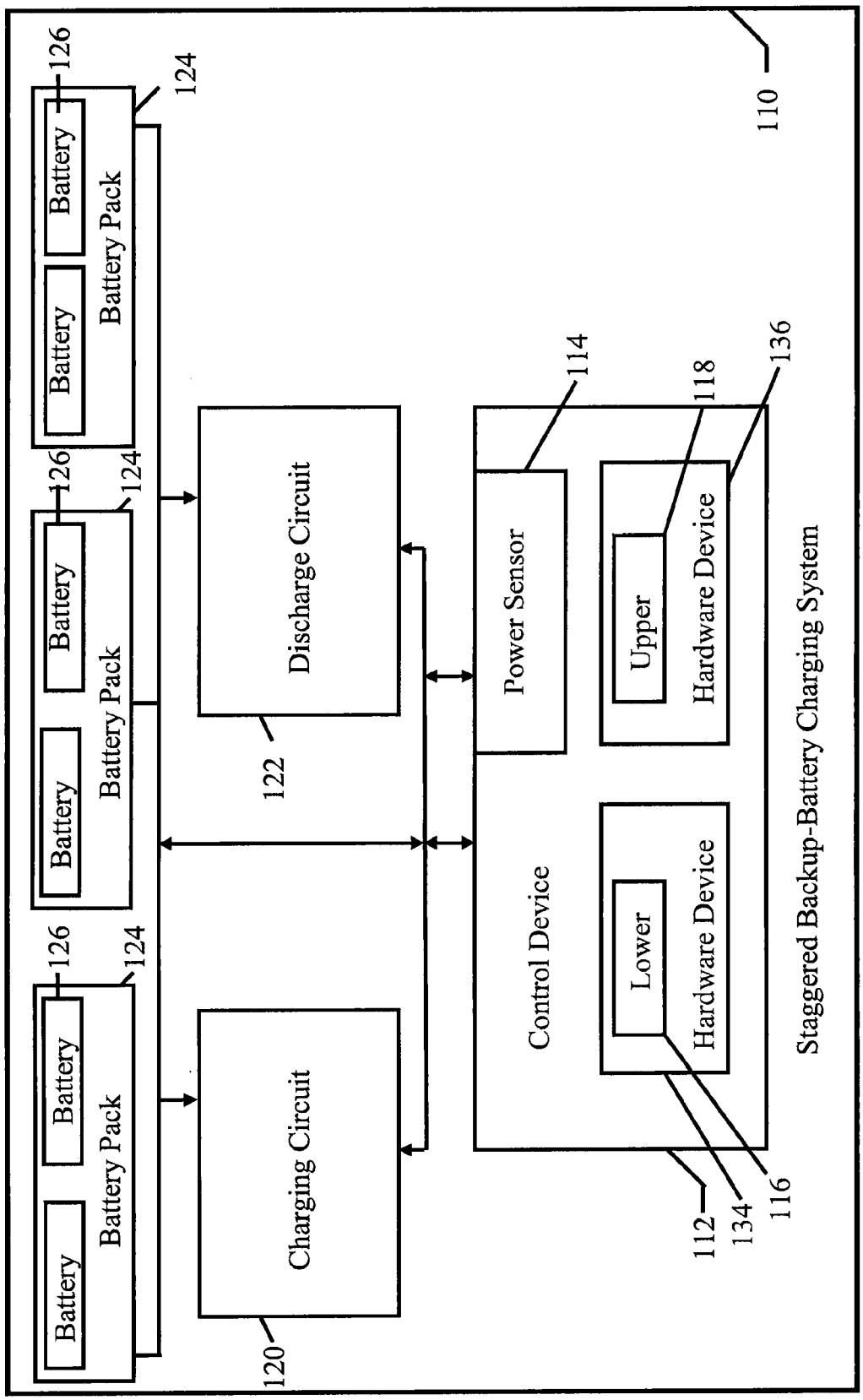
FIG. 4 is a block diagram of the control device of FIG. 2, wherein the control device includes a first hardware device for maintaining the lower threshold and a second hardware device for maintaining the upper threshold.

FIG. 4 is a block diagram of another embodiment of the control device 112 of FIG. 2, wherein the control device 112 includes a first hardware device 134 for maintaining the lower threshold and a second hardware device 136 for maintaining the upper threshold. The first and second hardware devices 134,136 may be a voltage divider circuit or a voltage detector. In this embodiment of the invention, output from the power sensor is applied to the first and second hardware devices 134,136. The control device reacts to signals from the first and second hardware devices 134,136 to direct the behavior of the charging circuit 120 and the discharge circuit. The control device of this embodiment may itself be a hardware device such as a solid-state circuit.

In a two battery-pack system, if both battery packs fall below the upper threshold (80%), the battery pack with the least effective energy capacity is recharged to the battery pack's maximum energy capacity. In this way, both battery packs are prevented from approaching the minimum acceptable effective energy capacity (60%) at the same time. This reduces the size or number of battery packs and reduces their associated cost and volume. In order to maximize battery life and reduce the deterioration of a battery pack's maximum energy capacity, the battery pack may be discharged to the minimum acceptable effective energy capacity before being recharged. The need to discharge before charging is a function of the battery type and where the threshold is set. For some battery technologies and thresholds, discharging the battery before charging improves battery life and capacity. In other cases, there is no benefit to the discharging, and so this step may be omitted.

The invention can be extended to a backup battery system having three or more battery packs. If two or more battery packs fall below the upper threshold, the battery pack with the least effective energy capacity is discharged and then recharged to maximum energy capacity. Alternatively, the upper threshold may be set so that a battery pack is discharged and recharged only when all the battery packs fall below the upper threshold. In yet another embodiment of the invention, the upper threshold may be set at the point an average battery pack would self-discharge to the lower threshold plus one-third of the difference between the lower threshold and the current maximum energy capacity.

In still another embodiment of the invention, the upper threshold may be set at the lower threshold plus two-thirds of the difference between the lower threshold and the current maximum energy capacity and an intermediary threshold may be set at the lower threshold plus one-third of the difference between the lower threshold and the current maximum energy capacity.

Figure 5:
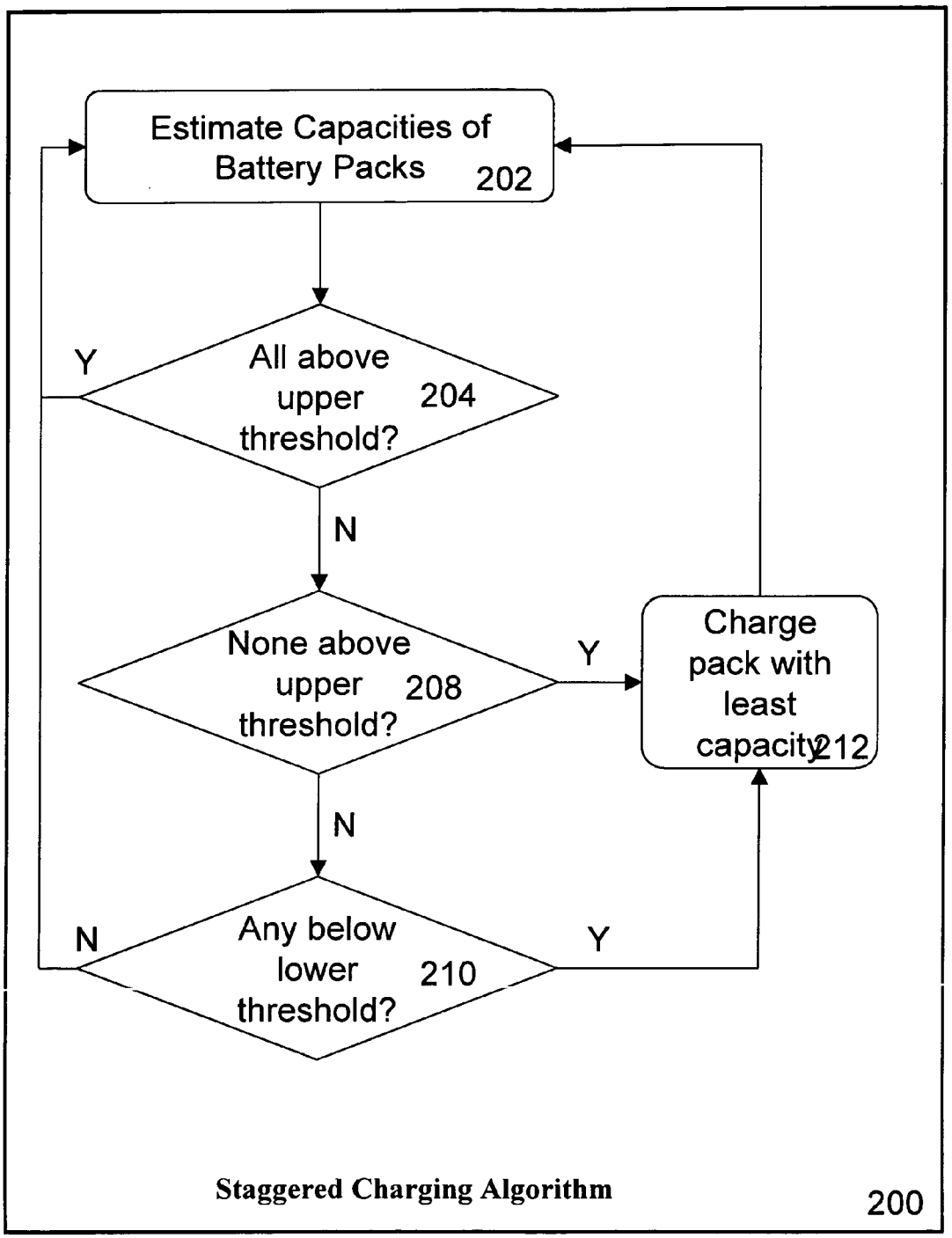
FIG. 5 is a flow chart illustrating a staggered charging algorithm according to the invention.

The process of staggered backup-battery charging is illustrated by the staggered charging algorithm 200 of FIG. 5. In step 202, each battery pack 124 is estimated by the power sensor 114 to ascertain its effective energy capacity. The power sensor includes a battery capacity estimator that considers battery cell voltage, temperature history, the energy required for prior recharging, and electric current used when on load. Additionally, the power sensor may take into account manufacturer's data on the battery cells. In this way, the battery capacity estimator would use the manufacturer's self-discharge curves versus time and temperature as well as the manufacturer's maximum capacity versus time and temperature curves in conjunction with a timer and periodic temperature sampling to estimate the capacity.

The controller 112 compares these estimates to the upper threshold 118 in step 204. If the effective energy capacities of all the battery packs 124 are above the upper threshold 118, no action is needed and the process returns to step 202 to restart the cycle.

If the effective energy capacity of any of the battery packs 124 is below the upper threshold 118, the process proceeds to step 208. In step 208, a determination is made as to whether the effective capacities of all of the battery packs 124 are below the upper threshold 118. If so, the process proceeds to step 212 where the controller 112 directs the charging circuit to charge the battery with the least amount of effective energy to its current maximum energy capacity. If at least one battery pack is above the upper threshold, the process proceeds to step 210.

In step 210, the effective energy capacity of the battery packs 124 are compared to lower threshold 116. If any of the batteries packs have a capacity less than the lower threshold, the process proceeds to step 212 where the controller 112 directs the charging circuit to charge the battery packs with the least amount of effective energy to its current maximum energy capacity. If the effective energy capacities of all the battery packs 124 are above the lower threshold 116, no further action is needed and the process returns to step 202 to restart the cycle.

In step 212, the process of charging the battery may optionally include discharging the battery to the lower threshold 116 using the discharge circuit 122. After charging the battery pack with the least capacity, the process returns to step 202 to restart the cycle.

Those skilled in the art of making backup battery systems may develop other embodiments of the present invention. For example, the invention may be extended to a backup-battery system including three or more battery packs. If two or more battery packs fall below the upper threshold, the battery pack with the least effective energy capacity is optionally discharged to the lower threshold and then recharged to its current maximum energy capacity. Alternatively, the upper threshold may be set so that a battery pack is discharged to the lower threshold and recharged only when all the battery packs fall below the upper threshold.

However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A backup-battery system, comprising:
   a first battery pack having a first effective energy capacity and a first maximum energy capacity;
   a second battery pack having a second effective energy capacity and a second maximum energy capacity;
   a charging circuit electrically connected to the first and second battery packs;
   a control device including a power sensor and a lower threshold and an upper threshold; wherein said power sensor is adapted to detect when the first energy capacity falls below the lower threshold and the control device is adapted to direct the charging circuit to charge the first battery pack to the first maximum energy capacity; wherein the power sensor is further adapted to detect when the first energy capacity and the second energy capacity fall below the upper threshold and the control device is further adapted to direct the charging circuit to charge the first battery pack to the first maximum energy capacity;
   a third battery pack having a third effective energy capacity and a third maximum energy capacity; wherein the power sensor is further adapted to detect when any two of the energy capacities have fallen below the upper threshold and the control device is further adapted to direct the charging circuit to charge the first battery pack to the first maximum energy capacity; and
   a discharge circuit electrically connected to the first, second, and third battery packs and the control device is further adapted to direct the discharge circuit to discharge the first battery pack to the lower threshold before directing the charging circuit to charge the first battery pack to the first maximum energy capacity.

2. A backup-battery system, comprising:
   a first battery pack having a first effective energy capacity and a first maximum energy capacity;
   a second battery pack having a second effective energy capacity and a second maximum energy capacity;
   a charging circuit electrically connected to the first and second battery packs;
   a control device including a power sensor and a lower threshold and an upper threshold; wherein said power sensor is adapted to detect when the first energy capacity falls below the lower threshold and the control device is adapted to direct the charging circuit to charge the first battery pack to the first maximum energy capacity; wherein the power sensor is further adapted to detect when the first energy capacity and the second energy capacity fall below the upper threshold and the control device is further adapted to direct the charging circuit to charge the first battery pack to the first maximum energy capacity;
   a third battery pack having a third effective energy capacity and a third maximum energy capacity; wherein the power sensor is further adapted to detect when the first, second, and third energy capacities have fallen below the upper threshold and the control device is further adapted to direct the charging circuit to charge the first battery pack to the first maximum energy capacity; and a discharge circuit electrically connected to the first, second, and third battery packs and the control device is further adapted to direct the discharge circuit to discharge the first battery pack to the lower threshold before directing the charging circuit to charge the first battery pack to the first maximum energy capacity.

3. A method of charging a backup-battery system, comprising the steps of:

detecting when a first energy capacity of a first battery pack falls below a lower threshold;

comparing the first enemy capacity to a second enemy capacity of a second battery pack;

if the first enemy capacity is less than the second energy capacity, directing a charging circuit to charge the first battery pack to a first maximum energy capacity;

detecting when the first energy capacity and the second energy capacity fall below an upper threshold;

charging the first battery pack to the first maximum energy capacity;

detecting a third energy capacity of a third battery pack;

detecting when any two of the energy capacities have fallen below the upper threshold; and charging the first battery pack to the first maximum energy capacity; and discharging the first battery pack to the lower threshold before the step of charging the first battery pack to the first maximum energy capacity.

4. A method of charging a backup-battery system, comprising the steps of:

detecting when a first energy capacity of a first battery pack falls below a lower threshold;

comparing the first energy capacity to a second energy capacity of a second battery pack;

if the first energy capacity is less than the second energy capacity, directing a charging circuit to charge the first battery pack to a first maximum energy capacity;

detecting when the first energy capacity and the second energy capacity fall below an upper threshold;

charging the first battery pack to the first maximum energy capacity; and discharging the first battery pack to the lower threshold before the step of charging the first battery pack to the first maximum energy capacity.

* * * * *